United States Patent
Mathers et al.

[15] 3,653,816
[45] Apr. 4, 1972

[54] PRODUCTION OF AMMONIUM METAVANADATE

[72] Inventors: James E. Mathers, Ulster; Felix F. Mikus, Towanda; Ramon L. Yale, Ulster, all of Pa.

[73] Assignee: Sylvania Electric Products Inc.

[22] Filed: May 28, 1970

[21] Appl. No.: 41,562

[52] U.S. Cl. .................................23/19 V, 23/51, 23/22, 23/24, 252/301.4
[51] Int. Cl. .........................................C22b 59/00
[58] Field of Search.................................23/19 V, 51, 22, 24

[56] References Cited

UNITED STATES PATENTS

| | | |
|---|---|---|
| 3,346,329 | 10/1967 | Hermann ..............................23/51 X |
| 3,300,276 | 1/1967 | Bretschneider et al. ...............23/51 X |
| 3,063,795 | 11/1962 | Smith.........................................23/51 |
| 3,087,786 | 4/1963 | Schoder..................................23/51 X |

Primary Examiner—Herbert T. Carter
Attorney—Norman J. O'Malley, Donald R. Castle and William H. McNeill

[57] ABSTRACT

A highly pure ammonium metavanadate with improved particle size and bulk density is produced from an impure ammonium metavanadate by dissolving the impure ammonium metavanadate in water, maintaining controlled temperature conditions for a period of time, filtering, maintaining the filtrate under controlled pH and temperature conditions for a specified period of time, crystallizing solid ammonium metavanadate, washing the crystals with water, vacuum drying under controlled temperature and heat treating under agitation and controlled temperature conditions.

7 Claims, No Drawings

PRODUCTION OF AMMONIUM METAVANADATE

BACKGROUND OF THE INVENTION

This invention relates to the production of a highly pure ammonium metavanadate. More particularly, it relates to a method for producing ammonium metavanadate of improved properties that can be used to produce an improved luminescent property.

Vanadium is generally found as an ore containing other metallic elements. Conventional purification techniques in producing commercial vanadate salts from vanadium sources do not completely remove all of the elements. Although the metals are present in the manufactured salts in rather minute amounts such as below 0.5 percent by weight, the impurities even at these low levels effect the brightness of luminescent materials produced from a vanadate raw material source such as ammonium metavanadate. A typical luminescent material that can be manufactured using ammonium metavanadate as a raw material is yttrium orthovanadate useful as a luminescent phosphor in cathode ray tubes and as a color corrector in mercury vapor lamps. Typical metal impurities that can be present include aluminum, calcium, chromium, copper, iron, magnesium, manganese, molybdenum, lead, silicon and titanium.

Additionally, technical grade or high purity commercial grade ammonium metavanadate generally have an average particle size greater than about 25 microns and a bulk density of about 13 to 15 g./in$^3$. Smaller average particle sizes such as below 10 microns and decreased bulk densities such as below about 7 g./in$^3$ yield improved brightness in the luminescent materials.

It is believed, therefore, that a process that produces a highly pure ammonium metavanadate having improved particle size and bulk density thereby enabling the production of a luminescent material having a higher brightness would be an improvement in the art.

SUMMARY OF THE INVENTION

In accordance with one aspect of this invention there is provided a process for producing a highly pure ammonium metavanadate having an improved particle size and bulk density. The process comprises the following sequential steps. An aqueous solution consisting essentially of water and an impure ammonium metavanadate having a weight ratio of ammonium metavanadate to water of from about 3:100 to about 7:100 is formed. The temperature of this solution is maintained at from about 90° C. to about 95°C. for about one hour and is then filtered. After filtration, the pH of the filtrate is adjusted to about 9 with sufficient relatively dilute ammonium hydroxide. The solution having the adjusted pH is held at about 40°C. for about 1 hour under agitation; thereafter, the temperature of the pH adjusted solution is lowered to at least about 16°C. and held at that temperature while agitating for an additional hour. Subsequently, the agitation is discontinued and the crystals that are formed are separated from the liquid. After separation the crystals are washed by slurrying with water at a temperature of about 40° C. The washed crystals are then separated from the water and dried at 25° C. under about 20 mm. Hg. absolute pressure. After drying, the crystals are heat treated under agitation and at a temperature of about 45° C. to about 55° C. for about 24 to about 48 hours. The resulting product has a reduced metallic content and has an average particle size of less than about 10 microns and a bulk density of less than about 7 grams per cubic inch.

In accordance with an additional aspect of this invention there is provided a method for converting excess vanadium used in the manufacture of the luminescent materials into high purity ammonium metavanadate.

In accordance with a further aspect of this invention there is provided a method for producing an improved yttrium orthovanadate.

For a better understanding the the present invention, together with other and further objects, advantages, and capabilities thereof, reference is made to the following disclosure and appended claims in connection with the above description of some of the aspects of the invention.

DESCRIPTION OF THE PREFERRED EMBODIMENTS

Commercial grades of ammonium metavanadate are technical grade and "high purity" grade. Each of these vanadate source materials contain metallic impurities such as aluminum, calcium, chromium, copper, iron, magnesium, manganese, molybdenum, lead, silicon and titanium. Although each source contains some metal impurities, the high purity grade contains less impurities than the technical grade and has a whiter body color. In technical grade ammonium metavanadate the maximum individual metallic impurity content is generally less than about 0.5 percent by weight and has a body color (expressed as percent of the reflectance of magnesium oxide subjected to a 420 nm source of light) of from about 35 to about 45. "High purity" grade ammonium metavanadate generally contains a maximum individual metallic impurity content of about 0.1 percent by weight, and a body color of about 65 to 75. In most instances the particular impurity that is at the highest level will depend upon the source of vanadium bearing ore. In any event, any of the commercial grades of ammonium metavanadates can be appreciably up-graded by the practice of this invention.

An impure ammonium metavanadate source material, such as that previously described, and water are added together and the temperature adjusted to about 95° C. A weight ratio of metavanadate to water of from about 3:100 to about 7:100 can be used with a weight ratio of 5:100 being preferred. Lower temperatures can be used, however, the concentration of ammonium metavanadate will be decreased. Higher temperatures tend to decompose ammonium metavanadate, therefore, to achieve practical operating results it is preferred to form a solution having a weight ratio of ammonium metavanadate to water of about 5:100 so that the benefits of higher concentrations can be achieved without having insoluble material present.

The solution that is formed is held at about 95° C. for about 1 hour and then filtered to remove any insoluble material that is present.

The filtrate, while under agitation, is cooled to about 40° C and the pH is adjusted to about 9.0 by the addition of sufficient dilute ammonium hydroxide. By dilute ammonium hydroxide it is meant an aqueous ammonium hydroxide solution having a concentration of ammonium hydroxide of from about 2 percent to about 5 percent by weight. Although ammonium hydroxide solutions having concentration greater than about 5 percent by weight can be used, accurate pH control is more difficult. If solutions more dilute than about 2 percent by weight are used, the concentration of vanadate in the solution becomes too low for practical operating conditions. Agitation is generally provided with conventional agitators used to provide agitation to solutions having the viscosity of about that of water. The degree of agitation need only to be sufficient to achieve good distribution of the components of the solution. The type of agitation and degree of agitation will be dependent upon the type of vessel used, availability of equipment and other factors that will be obvious to those familiar with chemical processing equipment design.

After the filtrate is maintained at about 40° C. and the pH is maintained at about 9 for about 1 hour, the temperature of the solution is lowered to at least about 16° C. while under agitation. The lower temperature and agitation is maintained for about 1 hour and then the agitation is discontinued. The resulting crystals are separated from the liquid phase. Generally, settling and decantation of the clear supernatant liquid is the practical method for separating the crystals from the supernatant liquid. The crystals are thereafter washed by slurrying in water having a temperature of about 40° C. Water having a temperature above about 40° C. dissolves too much of the vanadate and water having a temperature much below about 40° C. yields inadequate purification. The crystals are separated and dried at about 25° C. in a vacuum drier having an absolute pressure of about 20 mm. Hg.

The dried crystals are thereafter heated under agitation to a temperature of from about 48° C. to about 50° C. for about 24 to about 48 hours to thereby produce an ammonium metavanadate having a bulk density of about 5–6 grams/in³ and a white body color of about 85–95 percent of MgO when subjected to 420 nm light.

In the manufacture of vanadate phosphors excess vanadium is used and thereafter is removed by washing the fired phosphor with sodium hydroxide. The vanadium is generally in the form of $V_2O_5$. About 1.5 parts of ammonium chloride is added for every 1 part of $V_2O_5$ in the caustic wash solution. The solution is held at about 25° C. for about 30 minutes while under agitation. The agitation is discontinued and the mixture is filtered and the crystals are washed with an ammonium chloride solution containing about 5 percent ammonium chloride washed with water having a temperature of about 25° C. The resulting ammonium metavanadate crystals can be purified and improved by the process of this invention.

To more fully illustrate the subject invention, the following detailed non-limiting examples are presented. All parts, proportions, and percentages are by weight unless otherwise indicated.

EXAMPLE 1

About five parts of an impure ammonium metavanadate is dissolved in about 100 parts of water having a temperature of about 95° C. The ammonium vanadate has an average particle size of about 30.5 microns (FSSS). The following impurities are analyzed as being present by emission spectroscopy.

| | |
|---|---|
| Al | 5 to 50 ppm |
| Ca | 10 to 100 ppm |
| Cr | 10 to 100 ppm |
| Cu | 5 to 50 ppm |
| Fe | 10 to 100 ppm |
| Mg | 1 to 10 ppm |
| Mm | 1 to 10 ppm |
| Mo | 1 to 10 ppm |
| Pb | 1 to 10 ppm |
| Si | 0.01 to 0.1% |
| Ti | 1 to 10 ppm |

A sample has a body color of about 73 percent of the reflectance of MgO when subjected to 420 nm excitation. After the solution is formed, the temperature is maintained at about 95° C. for about 1 hour. The hot solution is thereafter filtered and the filtrate is cooled to 40° C. The pH of the cooled filtrate is adjusted to about 9 with about 20 parts of an aqueous solution of ammonium hydroxide having a concentration of about 2.9 percent by weight. Agitation is continued and the temperature is maintained at about 40° C. for about 1 hour. Thereafter, the ammonium metavanadate solution is cooled to about 16° C. with agitation. After the temperature has been at 16° C. for about one hour the agitation is discontinued and the crystals are separated and washed with about three parts of water having a temperature of about 40° C. The wet, washed crystals are dried under vacuum at about 20 mm. Hg. and a temperature of about 25° C. for about 24 hours. The dried crystals are blended and heated during the blending to a temperature of about 48°–50° C. for about 24 to 48 hours.

The resultant ammonium metavanadate has a bulk density of about 5 to 6 grams/in³ and an average particle size of about 9.6 microns (FSSS). The body color is white and has about 90 of the reflectance of MgO when subjected to 420 nm excitation.

Analysis of samples by emission spectroscopy for impurities indicate the following impurity content:

| | |
|---|---|
| Al | less than 1 ppm |
| Ca | 10 to 100 ppm |
| Cr | 1 to 10 ppm |
| Cu | less than 1 ppm |
| Fe | 1 to 10 ppm |
| Mg | 1 to 10 ppm |
| Mn | 1 to 10 ppm |
| Mo | Not detectable |
| Pb | less than 1 ppm |
| Si | 10 to 100 ppm |
| Ti | not detectable |

Analysis of the mother liquor by emission spectroscopy from the crystallization step when concentrated by removing about 80 percent of the water indicates the following:

| | |
|---|---|
| Al | less than 1 ppm |
| Ca | 50 to 500 ppm |
| Cr | 10 to 100 ppm |
| Cu | less than 1 ppm |
| Fe | 10 to 100 ppm |
| Mg | 10 to 100 ppm |
| Mm | 5 to 50 ppm |
| Mo | 10 to 100 ppm |
| Pb | not detected |
| Si | 50 to 500 ppm |
| Ti | 10 to 100 ppm |

The foregoing analyses indicates that the procedure removes a large portion of the metallic impurities. It is also apparent that body color, bulk density and particle size are improved.

EXAMPLE 2

A series of samples of ammonium metavanadate are used to produce europium activated yttrium orthovanadate phosphors by heating ammonium metavanadate and co-precipitated yttrium and europium oxalate at about 975° C. for about 2 hours. The various europium activated yttrium orthovanadate phosphor are subjected to various ultraviolet wave lengths as excitation media and the brightness is measured and expressed as the percentage of a known yttrium orthovanadate standard. Table I gives the results.

Sample 1 is produced from a technical grade ammonium metavanadate supplied by Vanadium Corporation.

Sample 2 is produced from a high purity grade ammonium metavanadate supplied by Union Carbide Company.

Sample 3 is produced from technical grade ammonium metavanadate supplied by Vanadium Corporation.

Sample 4 is produced from a high purity grade ammonium metavanadate supplied by Union Carbide Company.

Sample 5 is produced from an ammonium metavanadate recovered from the excess vanadium used in producing a yttrium orthovanadate phosphor.

Sample 1a is produced from the ammonium metavanadate of Sample 1 treated as in Example 1.

Sample 2a is produced from the ammonium metavanadate of Sample 2 treated as in Example 1.

Sample 3a is produced from the ammonium metavanadate of Sample 3 treated as in Example 1.

Sample 4a is produced from the ammonium metavanadate of Sample 4 treated as in Example 1.

Sample 5a is produced from the ammonium metavanadate of Sample 5 as treated in Example 1.

TABLE I $NH_4VO_3$ vs. UV Luminescent Efficiency of $YVO_4$:Eu Phosphor

| Sample | UV Brightness, % | | | |
|---|---|---|---|---|
| | 254 nm | 325 nm | 396 nm | 466 nm |
| 1 | 90 | 90 | 58 | 80 |
| 2 | 100 | 100 | 122 | 124 |
| 3 | 104 | 104 | 133 | 134 |
| 4 | 104 | 104 | 132 | 133 |
| 5 | 100 | 102 | 136 | 137 |
| 1a | 101 | 96 | 68 | 91 |
| 2a | 105 | 105 | 138 | 140 |
| 3a | 106 | 106 | 148 | 148 |
| 4a | 106 | 106 | 162 | 158 |
| 5a | 106 | 107 | 157 | 155 |

EXAMPLE 3

Following the procedure of Example 2 except that various amounts of excess ammonium metavanadate are used to produce the europium activated yttrium orthovanadate, eight samples of yttrium orthovanadate are prepared. These samples are thereafter tested for brightness when subjected to ultraviolet and cathode ray excitation. The results are shown in Tables 2 and 3.

Samples 6, 7, 8 and 9 are produced from a high purity ammonium metavanadate supplied by Union Carbide using the percent excess shown in Table 2 and 3. Samples 6a, 7a, 8a and 9a are produced from the same ammonium metavanadate but purified in accordance with Example 1. The standards used for comparison are a yttrium orthovanadate produced by the prior art.

TABLE 2

Before treatment

| Sample | Phosphor composition, percent excess $NH_4VO_3$ used | UV brightness, percent | | | |
| --- | --- | --- | --- | --- | --- |
| | | 254 nm | 325 nm | 396 nm | 466 nm |
| 6 | 25 | 101 | 102 | 85 | 108 |
| 7 | 50 | 101 | 103 | 101 | 126 |
| 8 | 75 | 103 | 104 | 102 | 128 |
| 9 | 100 | 104 | 104 | 99 | 125 |

After treatment

| 6a | 25 | 105 | 104 | 109 | 130 |
| --- | --- | --- | --- | --- | --- |
| 7a | 50 | 103 | 104 | 126 | 145 |
| 8a | 75 | 101 | 105 | 140 | 159 |
| 9a | 100 | 105 | 108 | 148 | 170 |

TABLE 3

Before Treatment

| Sample | Phosphor Composition % Excess $NH_4VO_3$ Used | CRT Brightness, %, $YVO_4$ Eu Phosphor |
| --- | --- | --- |
| 6 | 25 | 89 |
| 7 | 50 | 94 |
| 8 | 75 | 99 |
| 9 | 100 | 98 |

After Treatment

| 6a | 25 | 102 |
| --- | --- | --- |
| 7a | 50 | 101 |
| 8a | 75 | 102 |
| 9a | 100 | 101 |

While there have been shown and described what are at present considered the preferred embodiments of the invention, it will be obvious to those skilled in the art that various changes and modifications may be made therein without departing from the scope of the invention as defined by the appended claims.

What is claimed is:

1. A process for producing a luminescent grade ammonium metavanadate from a relatively impure ammonium metavanadate containing metallic impurities and having a body color of from about 35 to 75 percent of the reflectance of magnesium oxide under a 420 nm light source, said process comprising forming an aqueous solution consisting essentially of said impure ammonium metavanadate and water in weight ratios of from about 3:100 to about 7:100 and at a temperature of from about 90° C. to about 95° C., maintaining said temperature for at least about 1 hour, filtering said solution to remove insoluble material therefrom, adding to the resultant filtrate a sufficient amount of ammonium hydroxide to adjust the pH of said filtrate to about 9 and lowering the temperature of said solution to about 40° C. for about 1 hour while under agitation, reducing the temperature of the pH adjusted filtrate to at least about 16° C., and maintaining said temperatures and agitation for at least about 1 hour to form crystals of ammonium metavanadate, separating said crystals, adding at least about 50 parts by weight of water, at a temperature of about 40° C., per part of said ammonium metavanadate crystals and separating the resulting wet crystals of ammonium metavanadate from said water, drying said wet crystals under about 20 mm. Hg. of absolute pressure at about 25° C. and heating the resulting dried crystals while under agitation to a temperature of at least about 45° C. for at least about 24 hours to thereby produce an ammonium metavanadate having a bulk density of about 5 to 6 grams per cubic inch, a reduced metallic content and a body color of from about 85 to about 95 percent of the reflectance of magnesium oxide under a 420 nm light source.

2. A process according to claim 1 wherein said ratio is about 5:100.

3. A process according to claim 2 wherein said temperature of said aqueous solution is about 95° C.

4. A process for reclaiming excess vanadium values from luminescent vanadate material manufacture comprising washing the luminescent vanadate material with an aqueous solution of an alkali metal hydroxide, separating the resulting alkali metal hydroxide solution from said luminescent material, adding at least about 1.5 parts by weight of ammonium chloride per part of vanadium pentaoxide in said solution, adjusting the temperature of the resulting mixture to at least about 25° C., separating the resulting crystals of ammonium metavanadate, washing said crystals with an aqueous solution of ammonium chloride, washing the resulting crystals with sufficient water to remove essentially all of the residual ammonium chloride, forming an aqueous solution consisting essentially of said ammonium metavanadate and water in weight ratios of from about 3:100 to about 7:100, and at a temperature of from about 90° C. to about 95° C., maintaining said temperature for at least about 1 hour, filtering said solution to remove insoluble material therefrom, adding to the resultant filtrate a sufficient amount of ammonium hydroxide to adjust the pH of said filtrate to about 9 and lowering the temperature of said solution to about 40° C. for about 1 hour while under agitation, reducing the temperature of the pH adjusted filtrate to at least about 16° C., and maintaining said temperature and agitation for at least about 1 hour to form crystals of ammonium metavanadate, separating said crystals, adding at least about 50 parts by weight of water, at a temperature of about 40° C., per part of said ammonium metavanadate crystals, separating wet crystals of ammonium metavanadate from said water, drying said wet crystals under about 20 mm. Hg. of absolute pressure at about 25° C. and heating said crystals while under agitation to a temperature of at least about 45° C. for at least about 24 hours to thereby produce an ammonium metavanadate having a bulk density of about 5 to 6 grams per cubic inch, a reduced metallic content and a body color of from about 85 to about 95 percent of the reflectance of magnesium oxide under a 420 nm light source.

5. A process according to claim 4 wherein said ratio of said ammonium metavanadate to water is about 5:100.

6. A process according to claim 5 wherein said temperature of said aqueous solution of ammonium metavanadate is about 95° C.

7. A process according to claim 6 wherein said aqueous solution of ammonium chloride has a concentration of about 5 percent by weight.

* * * * *